(12) United States Patent
Brown

(10) Patent No.: US 7,223,801 B2
(45) Date of Patent: *May 29, 2007

(54) JOINT FILL COMPOSITION AND METHOD

(75) Inventor: Scott A Brown, Spring, TX (US)

(73) Assignee: Baysystems North America LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/801,164

(22) Filed: Mar. 5, 2004

(65) Prior Publication Data

US 2004/0176492 A1   Sep. 9, 2004

Related U.S. Application Data

(60) Provisional application No. 60/452,765, filed on Mar. 7, 2003, provisional application No. 60/452,706, filed on Mar. 7, 2003.

(51) Int. Cl.
*C08G 18/28* (2006.01)

(52) U.S. Cl. ........................ 521/130; 521/131; 521/159; 521/164; 521/167; 521/170; 521/174; 528/48; 528/52; 528/58; 528/59; 528/76; 528/78; 528/85

(58) Field of Classification Search ................ 521/130, 521/164, 167, 170, 174, 131, 159; 528/48, 528/52, 58, 59, 76, 78, 85

See application file for complete search history.

(56) References Cited

U.S. PATENT DOCUMENTS

| 3,983,064 | A | | 9/1976 | Olstowski |
| 4,154,716 | A | | 5/1979 | Olstowski et al. |
| 4,264,363 | A | | 4/1981 | Cech |
| 4,567,708 | A | | 2/1986 | Haekkinen |
| 4,608,208 | A | | 8/1986 | Yogo et al. |
| 4,608,280 | A | | 8/1986 | Robinson et al. |
| 4,909,669 | A | | 3/1990 | Baker |
| 5,328,648 | A | | 7/1994 | McBrien et al. |
| 5,489,405 | A | | 2/1996 | Holbert et al. |
| 5,804,093 | A | | 9/1998 | Wyke et al. |
| 5,900,195 | A | | 5/1999 | Pool et al. |
| 5,951,796 | A | * | 9/1999 | Murray ..................... 156/78 |
| 6,288,133 | B1 | | 9/2001 | Hagquist |
| 6,402,201 | B1 | | 6/2002 | Pool et al. |
| 6,433,033 | B1 | * | 8/2002 | Isobe et al. ................ 521/170 |
| 6,521,673 | B1 | | 2/2003 | Brown |

* cited by examiner

*Primary Examiner*—John M. Cooney, Jr.
(74) *Attorney, Agent, or Firm*—Joseph C. Gil; Lyndanne M. Whalen

(57) ABSTRACT

A composition and method for protecting pipeline joints is disclosed. A mold covers the exposed pipeline joint. A reaction composition including a polyol, an isocyanate, and an ester, preferably 2,2,4-trimethyl-1,2-pentanediol diisobutyrate, is added to the mold and allowed to react to form a polymer.

13 Claims, No Drawings

JOINT FILL COMPOSITION AND METHOD

CROSS-REFERENCE TO RELATED APPLICATIONS

This application claims the benefit of U.S. Provisional Application No. 60/452,706 filed Mar. 7, 2003, and U.S. Provisional Application No. 60/452,765 filed Mar. 7, 2003, both of which are hereby incorporated by referenced in their entirety for all purposes.

BACKGROUND OF THE INVENTION

1. Field of the Invention

The invention relates to a composition and method for protecting pipeline joints. More particularly, the invention relates to a composition and a method for infilling the space at a welded joint in a coated (ex. concrete, polyethylene, etc.) pipeline between the ends of the coating on sequential joints of pipe.

2. Description of the Related Art

Offshore pipelines larger than about 12 inches in diameter are commonly coated with a thick layer of concrete to weight the pipeline down in the water. Such concrete coatings or weight coatings are applied to individual lengths of the pipe with the coating extending the full length of the pipe except for several inches near each end. Prior to applying the concrete coating, the pipe lengths are usually coated with a material, such as epoxy, to protect the pipe from corrosion. This coating material is also terminated several inches from each end. Successive lengths of pipe are joined together by welding, leaving a gap in the coating material and in the concrete covering at each joint.

It is the usual practice to apply a coating to the pipe in this gap to protect the pipe against corrosion, for example with a hot fusion bonded epoxy and/or a shrink sleeve, and to fill the gap between the ends of the concrete coatings so as to provide a smooth, uninterrupted covering for the pipeline. The pipeline can then move smoothly over the pipeline lay barge or vessel rollers and down the stinger to the sea bed.

The gaps in the pipeline have been filled with various materials by various techniques. One procedure that has been used is to place a metal sleeve or mold over the gap and fill the sleeve with molten mastic which solidifies as it cools. However, in most cases the pipeline must be in a condition for handling immediately after the gaps are filled, so that the laying of the pipeline can proceed without delays. The mastic filling does not set to a sufficiently strong material within the required time to allow further processing of the pipe without additional reinforcement to protect the mastic. Therefore, in conventional filling operations where mastic is used, the sleeve is left in place, so that it remains on the pipe on the ocean floor. This is objectionable, since the sleeve can snag fishnets, and cause other damage to marine operations. Moreover, the filling of the gaps with mastic in this way is highly labor intensive, and therefore expensive.

Another method that has been used to fill the gaps in concrete coated pipeline joints utilizes a fast cure material inside a removable mold which is removed before the pipe is advanced into the water. Various polymer concretes, such as those disclosed in U.S. Pat. No. 4,608,280, or polyurethanes have been used in this way. The removable mold surface is coated with a release agent to prevent the fast cure material from sticking to the mold surface. Such a mold release adds expense and processing time, and is inefficient if improperly applied. Furthermore, some of the release material remains on the surface of the fast cure material and enters the water with the pipe as a potential environmental contaminant.

Other techniques replaced the mastic filler with other types of materials. In the methods disclosed in U.S. Pat. Nos. 5,328,648 and 5,489,405, the exposed portion of pipe was covered with a mold which was then filled with a filler material. The filler materials included granular or particulate matter having between about 1/16 inch to 1 inch diameter such as gravel, iron ore, wood chips, etc. which would not pack solidly or uniformly. Elastomeric polymers were then injected into the mold in an attempt to fill the interstices between the granular fill materials. The preferred polymers included rapid setting solid polyurethanes, as for example those prepared by the reaction of the polyhydroxyl containing compounds and the organic polyisocyanates described in U.S. Pat. Nos. 3,983,064, 4,154,716, and 4,246,363. After the polymer components had reacted completely the mold would be removed from the surface of the infill. The elastomeric polymers used in this method included a liquid modifer consisting primarily of aromatic hydrocarbons. The use of aromatic hydrocarbons in this application has several disadvantages including air and marine environmental and safety issues.

Another technique, disclosed in U.S. Pat. No. 4,909,669, involved wrapping the exposed portions of pipe with a thermoplastic sheet. The sheet overlapped the ends of the weight coat adjacent the exposed joint and was then secured in place by screws, rivets, or straps. To increase the rigidity and impact resistance this joint protection system required the installation of reinforcing members such as plastic bars or tubes to the interior of the sheet. The reinforcement bars or tubes either had to be precut and stored on the barge or else cut to the required fitting form as part of the installation process on the barge. This required additional handling and made the installation process more difficult.

Another method of reinforcing this joint protection system was to fill the lower portion of the annular space between the pipe and the plastic sheet with a material such as pre-formed foam half shell. When foam half shells were used in the lower portion of the annular space to provide support, the upper portion of the joint and the corrosion coating was in effect protected only by the plastic sheet enclosing the upper portion which had no foam covering. This could cause a particular problem if the pipelines were located where they would encounter the drag lines or trawler boards attached to the nets of fishing trawlers. The corrosion coating on the upper portion of the pipe joint could become damaged by this type of towed object. An additional problem with this joint protection system occurred when pipelines were laid in shallow waters, i.e., less than about 200 feet deep. Pipelines in shallow waters were often buried by using high pressure water jets which were directed at the ocean floor where the pipelines were to be buried. The water jets would wash out a trench into which the pipelines would be dropped for burial. The joint protection system could be damaged when the water jets came in contact with the pipeline joint because the plastic sheet over the top of the pipe joint was not reinforced.

Another method for protecting exposed pipeline joint sections, disclosed in U.S. Pat. Nos. 5,900,195 and 6,402,201, begins by forming a pliable sheet of cover material into a cylinder which is fitted over the exposed portions of the joint connection. The longitudinal end portions of the pliable sheet of cover material overlap the adjacent edges of the weight coating. Side edge portions of the sheet of cover material forming the cylinder are then overlapped tightly such that an annular pocket is formed about the exposed joint section. The outside side edge is then sealed to the surface of the sheet of cover material, completely encasing the exposed pipe and the annular pocket or space. Polyurethane chemicals are then injected into the empty annular space where they react to form a high density foam which fills the annular space. The cover material remains part of the joint fill and is not removed.

BRIEF SUMMARY OF THE INVENTION

The present invention includes an improved composition and method for infilling the gaps in pipelines having thick coatings, such as offshore pipelines formed from the concrete coated pipe using the improved composition. The preferred composition of the present invention includes polyol, isocyanate, and diluent. The diluent is preferably an ester diluent. More preferably, the composition includes an A-side component including polymeric MDI and 2,2,4-trimethyl-1,2-pentanediol diisobutyrate (sold by Eastman Chemical Company under the trademark TXIB), and a B-side component including a polyol, catalyst, water, TXIB, and surfactant. This preferred composition forms a foam having a high degree of open cells. Other preferred compositions can be used to produce non-foamed elastomer or solid polymers by excluding water (or other blowing agents) from the composition.

The preferred method of the present invention includes enclosing a mold around the exposed pipeline portion or gap, introducing the improved composition, and allowing the composition to react and form a polymer. The polymer formed by the reaction composition is preferably an open celled foam, but can be an elastomer, or a solid polymer depending upon the specific components utilized. The method of the present invention can include a variety techniques and materials to form the mold. The mold can be reusable or remain part of the gap pipeline joint protection.

DETAILED DESCRIPTION OF THE INVENTION

The present invention includes an improved composition and a method for infilling the gaps in pipelines having thick coatings, such as offshore pipelines formed from the concrete coated pipe.

The Composition

Generally, the composition comprises a polyol component (B-side), an isocyanate component (A-side), an ester component. The ester can be present in either the A-side, the B-side, or both. The combination of the ester with the polyol and isocyanate results in a reaction product having improved properties as compared to the polyurethane systems used in the joint infill systems of the prior art.

The ester is preferably a diester, and most preferably exemplified by, but not limited to, 2,2,4-trimethyl-1,3-pentanediol diisobutyrate (sold by Eastman Chemical Company under the trademark TXIB). TXIB is not reported to be a marine pollutant and does not have the same negative impact compared to the aromatic hydrocarbons of the prior art. The ester preferably is present in a range of from about 10 weight % to about 40 weight % of the total composition. The ester is more preferably present in the range of from about 25 weight % to about 40 weight %. All composition percentages disclosed herein are weight % unless specifically stated otherwise.

The isocyanate component of the composition can include isocyanates, polyisocyanates, or isocyanate prepolymers. Preferably, the isocyanate component is a polyisocyanate. The term polyisocyanate as used herein refers to any isocyanate having an average functionality greater than or equal to about 2.0. The polyisocyanate is preferably based on diphenylmethane diisocyanates such as those obtainable by a niline/formaldehyde condensation followed by phosgenation ("polymeric MDI") or derivatives of these polyisocyanates which may contain carbodiimide, biuret, urethane, isocyanurate, allophanate groups, and mixtures of compounds having these groups, and are liquid at room temperature. Preferred polyisocyanates are exemplified by, but not limited to, polymeric MDI sold by Bayer under the trademark MONDUR MR, by BASF under the trademark LUPRANATE M20S, by The Dow Chemical Company under the trademark PAPI 27 or by Huntsman Chemical under the trademark RUBINATE M.

Alternatively, an isocyanate homopolymer can be used in the composition if it is desired to produce an elastomeric joint fill system. Elastomeric joint fill systems may be desired for example in pipelines of lower diameter that have some flexibility. A preferred polyisocyanate homopolymer for the preparation of a elastomeric joint fill is exemplified by, but not limited to, a 143 equivalent weight modified 4,4'-diphenylmethane diisocyanate such as MM 103 sold by BASF, MONDUR CD sold by Bayer, ISONATE 143L sold by The Dow Chemical Company or R 1680 sold by Huntsman Chemical.

Alternatively, an isocyanate prepolymer can be used in the composition if it is desired to produce an elastomeric joint fill system. Preferred prepolymers include, but are not limited to MONDUR PF sold by Bayer, ISONATE 181 sold by The Dow Chemical Company, or R 1209 sold by Huntsman Chemical.

The polyol component of the composition can include a variety of polyols including polyether polyols, polyester polyols, or combinations. In the preferred embodiment, the polyol is a polyether polyol or combination of polyether polyols. More preferably, the polyol component includes a fast reacting amine based polyol. Preferred polyether polyols are exemplified by, but not limited to 40–770 (a tetrol, with a hydroxyl number average of 770) sold by Arch Performance Urethanes and Organics, VORANOL® 800 sold by The Dow Chemical Company, or QUADROL sold by BASF.

In addition to the polyol component, the isocyanate component, and the insoluable ester, other components may be desired in various embodiments of the composition of the present invention. Catalysts, surfactants, water, and other blowing agents are non-limiting examples of additional components.

Preferably a catalyst is used in the present invention. Preferred catalysts for use in the composition include, but are not limited to, organic tin compounds such as tin (II) octoate, dibutyl tin dilaurate, UL-22 (sold by Witco Chemical Organics Division under the trademark WITCO FOMREZ UL-22) or lead naphthenate (PbN); or tertiary amines such as N,N-dimethyl cyclohexylamine (DMCHA) sold as PolyCat 8 by Air Products & Chemicals, 1,4-diazabicyclo [2.2.2]octane (TEDA) sold under the tradename DABCO by Air Products & Chemicals, and 70% bis(dimethylaminoethyl)ether in DPG (sold as BL-11 by Air Products & Chemicals); or amine polyol catalysts such as 33% TEDA in glycol or dimethylethanolamine (DMEA); amine catalysts such as pentamethyldiethylenetriamine (PMDETA). Other conventional amine and organometallic catalysts known for use in polyurethane forming reactions may be used.

Preferably, a surfactant is used in the composition when an open celled foam is desired. Surfactants such as the polyether polysiloxanes known to be useful in polyurethane foam forming reactions may be used in the composition. Non-silicone surfactants may also be used. The non-silicone surfactants include, but are not limited to, LK443 (sold by Air Products). Suitable surfactants may be obtained from Goldschmidt Chemical, Air Products & Chemicals, Inc., Witco or others. Preferred surfactants for use in the composition include Y-10762 sold by OSI, B8423, B8934, and B8935 sold by Goldschmidt Chemical. A small about of aromatic hydrocarbon can also be used to increase the open cell content of foams.

Preferably, the composition will include water. Water, may be added in a quantity of up to about 5% by weight, preferably up to about 4% by weight, and most preferably up to about 2% by weight based on the weight of polyisocyanate. Alternatively, other blowing agents can be used in combination with or as replacements for water. Organic blowing agents include, but are not limited to, non-ozone depleting hydrofluorocarbons, non-ozone depleting hydrochlorofluorocarbons and aliphatic hydrocarbons. Conventional blowing agents known for preparing water-blown and non-water blown polyurethanes may be used. The blowing agents may be used singly or in mixtures.

U.S. Pat. No. 6,521,673 describes many of the components that are suitable for use in the present composition. Other compositions described in this patent can be used to form closed cell or elastomeric joint fill polymers. U.S. Pat. No. 6,521,673 is hereby incorporated by reference in its entirety for all purposes.

An example of a preferred composition includes an A-side comprising between about 15 weight % to about 25 weight % TXIB with the remainder of the A-side being polymeric MDI. The B-side of this preferred composition comprises about 35 weight % to about 45 weight % of an amine based polyether polyol, about 50 weight % to about 65 weight % TXIB, about 0.25 weight % to about 2.00 weight % surfactant, about 0.75 weight % to about 1.5 weight % water, and a combination of amine catalyst and tin catalyst of less than about 0.2 weight percent. In this preferred embodiment, the A-side comprises about 50 weight % to about 60 weight % of the total composition and the B-side comprises about 40 weight % to about 50 weight %. Preferably, the components of this preferred composition are reacted to produce a foam that has a free rise density of between about 4 and about 8 pounds/cubic foot, most preferably about 6 pounds/cubic foot, and a packed in the mold density of between about 7 and about 12 pounds/cubic foot, most preferably about 9–10 pounds/cubic foot. Preferably, the components of this preferred composition are reacted to produce a foam that has an open cell content of greater than about 50%, more preferably greater than 80%, and most preferably greater than 90%.

The following non-limiting examples demonstrates preferred compositions for filling gaps on weight coated pipes.

EXAMPLE 1

An experimental pipe joint infilling composition was tested including the following components:

| B-Side Ingredients | Parts by Weight |
| --- | --- |
| 40-770 polyether polyol | 38.0 |
| Water | 1.30 |
| Polycat 8 | 0.10 |
| UL-22 | 0.00375 |
| TXIB | 58.00 |
| Y-10762 silicone surfactant | 2.0 |

The B-Side components were reacted with an A-side comprising 80 weight % polymeric MDI and 20 weight % TXIB. The composition comprised 54.8 weight % A-side and 45.2 weight % B-side. The resulting reaction product was an open celled polyurethane foam having a free rise density of about 6 pounds/cubic foot, a packed in the mold density between 9 and 10 pounds/cubic foot, and an open cell content of about 84.5%, 7.2% closed cells, and 8.2% cell walls.

EXAMPLE 2

An second experimental pipe joint infilling composition was tested including the following components:

| B-Side Ingredients | Parts by Weight |
| --- | --- |
| 40-770 polyether polyol | 40.0 |
| Water | 1.30 |
| Polycat 8 | 0.20 |
| Polycat 5 | 0.10 |
| Dabco 33LV | 0.13 |
| TXIB | 57.6 |
| Y-10762 silicone surfactant | 0.8 |

The B-Side components were reacted with an A-side comprising 85 weight % polymeric MDI and 15 weight % TXIB. The composition comprised 54.8 weight % A-side and 45.2 weight % B-side giving an isocyanate index of about 1.10. The resulting reaction product was an open celled polyurethane foam having a free rise density of about 6.5 pounds/cubic foot, a packed in the mold density about 10.5 pounds/cubic foot, and an closed cell content of about 9.0%. Parallel compressive strength was approximately 250–300 pounds per square inch at 10% deflection.

The Method

The preferred method of the present invention generally includes enclosing a mold around the exposed pipeline portion or gap, introducing the reaction composition, and allowing the composition to react and form a polymer. The polymer formed by the reaction composition can be an open celled foam or an elastomer depending upon the specific components utilized as discussed above.

The method begins with the installation of a mold enclosing the gap around the pipeline joint. A variety of methods of installing or forming a mold around the gap are known in the art and can be utilized in the current method. For example, various mold techniques are disclosed in U.S. Pat. Nos. 5,328,648, 5,489,405, 5,804,093, 5,900,195, and 6,402,201. Each of these patents are hereby incorporated by reference in their entirety for all purposes.

After installation of the mold, the A-side and B-side components of the composition are added to the inside of the mold. The A-side and B-side components can be premixed, injected by a reaction head, or combined and inserted using other techniques such as would be known to a person of ordinary skill in the art. Once the composition has been added to the inside of the mold, the components are allowed to react and form a polymer. Preferably, the reaction process is quick and polymer formation is substantially complete within a few minutes time.

As one alternative step, the mold may be filled with filler material such as gravel, etc. prior to addition of the reaction composition. The composition will react and form polymer around the filler material and hold it in place. As an additional alternative step, a permeable membrane may be included along the outer portion of the mold prior to addition of the reaction components. The permeable membrane will adhere to the outer surface of the polymer when the reaction is complete and act as a protective skin to prevent damage to the polymer. Examples of a permeable membrane can include permeable polyethylene sheeting, or coarse gauge mesh materials.

The foregoing disclosure and description of the invention are illustrative and explanatory thereof, but to the extent foreseeable, the spirit and scope of the invention are defined by the appended claims.

I claim:

1. A method for filling a gap at the junction between two lengths of coated pipe, the method comprising:
    enclosing the gap with a mold having an opening;
    introducing a joint filling composition into the mold; and
    allowing the joint fill composition to react and form a foam;
    wherein the joint filling composition comprises:
        an A-side component comprising between about 75 weight % to about 85 weight %, based on total weight of the A-side component, of polymeric MDI and between about 15 weight % and about 25 weight %, based on total weight of the A-side component, 2,2,4,-trimethyl-1,2-pentanediol diisobutyrate; and
        a B-side component comprising between about 35 weight % and about 45 weight %, based on total weight of the B-side component, of amine based polyether polyol, and about 50 weight % to about 65 weight %, based on total weight of the B-side component, 2,2,4-trimethyl-1,2-pentanediol diisobutyrate.

2. The method of claim 1, wherein an amine catalyst is included in the joint filling composition.

3. The method of claim 1, wherein the composition further comprises water.

4. The method of claim 1, wherein the composition further comprises hydrofluorocarbon blowing agent.

5. The method of claim 1, wherein the composition further comprises a silicone based surfactant.

6. The method of claim 1, further comprising the step of removing the mold after formation of the foam.

7. The method of claim 1, wherein the foam comprises a polyurethane foam having an open cell content of about eighty percent or higher.

8. The method of claim 1, wherein the foam comprises a polyurethane foam having an open cell content of about ninety percent or higher.

9. The method of claim 1, wherein the foam comprises a polyurethane foam having a density of between about 2 and about 12 pounds per cubic foot.

10. The method of claim 1, further comprising the step of adding filler material to the mold, after the enclosing step and before the step of introducing the reaction mixture.

11. The method of claim 1, further comprising the step of adding a permeable membrane into the mold before the step of introducing the reaction mixture.

12. The method according to claim 1, wherein the composition further comprises a hydrocarbon blowing agent.

13. The method according to claim 1, wherein the polymeric MDI is an isocyanate prepolymer.

* * * * *